US011520224B2

United States Patent
Kamigaki et al.

(10) Patent No.: US 11,520,224 B2
(45) Date of Patent: Dec. 6, 2022

(54) PROJECTION LENS AND PROJECTION DEVICE

(71) Applicant: FUJIFILM Corporation, Tokyo (JP)

(72) Inventors: Tetsuo Kamigaki, Saitama (JP); Hitoshi Shimizu, Saitama (JP); Yasuto Kuroda, Saitama (JP); Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 17/244,200

(22) Filed: Apr. 29, 2021

(65) Prior Publication Data

US 2021/0247683 A1  Aug. 12, 2021

Related U.S. Application Data

(63) Continuation of application No. PCT/JP2019/043265, filed on Nov. 5, 2019.

(30) Foreign Application Priority Data

Nov. 2, 2018 (JP) .............................. JP2018-207736

(51) Int. Cl.
*G03B 21/30* (2006.01)
(52) U.S. Cl.
CPC ................................... *G03B 21/30* (2013.01)
(58) Field of Classification Search
CPC .... G03B 21/006; G03B 21/008; G03B 21/28; G03B 21/30; G03B 21/142; G03B 21/145;

(Continued)

(56) References Cited

U.S. PATENT DOCUMENTS 11,061,306 B2 * 7/2021 Sakamoto ............ G03B 21/006
2004/0233394 A1 * 11/2004 Gohman ................ G02B 13/16
353/70

(Continued)

FOREIGN PATENT DOCUMENTS

CN       101676793 A    3/2010
CN       206671736 U   11/2017
(Continued)

OTHER PUBLICATIONS

Chinese Office Action and Search Report for Chinese Application No. 201980071920.3, dated Nov. 18, 2021, with English translation.

(Continued)

*Primary Examiner* — Sultan Chowdhury
(74) *Attorney, Agent, or Firm* — Birch, Stewart, Kolasch & Birch, LLP

(57) ABSTRACT

There is provided a projection lens that is mounted on a housing of a projection device including an electro-optical element. The projection lens comprises an optical system through which light passes, a second holding unit through which light parallel to a second optical axis passes and which is moved rotationally with respect to the housing, a third holding unit through which light parallel to a third optical axis obtained from bending of the second optical axis passes and which is moved rotationally with respect to the second holding unit, an electric drive unit that electrically controls rotational movement of the second holding unit with respect to the housing, rotational movement of the third holding unit with respect to the second holding unit, or drive of the optical system, and a cover part that covers the electric drive unit.

20 Claims, 6 Drawing Sheets

(58) Field of Classification Search
CPC ...... G03B 21/147; G03B 21/208; H04N 5/74; H04N 5/2252; H04N 9/315; H04N 9/317; H04N 9/3141; H04N 9/3155
See application file for complete search history.

(56) References Cited

U.S. PATENT DOCUMENTS

| | | | |
|---|---|---|---|
| 2015/0192756 A1 | 7/2015 | Uno et al. | |
| 2015/0234159 A1 | 8/2015 | Nagahara | |
| 2017/0293210 A1 | 10/2017 | Shimizu | |
| 2018/0217489 A1* | 8/2018 | Kuroda | G02B 7/02 |
| 2019/0219802 A1 | 7/2019 | Kuroda | |
| 2019/0219915 A1 | 7/2019 | Kayano | |

FOREIGN PATENT DOCUMENTS

| | | |
|---|---|---|
| CN | 207780456 U | 8/2018 |
| JP | 9-197341 A | 7/1997 |
| JP | 11-109504 A | 4/1999 |
| JP | 2006-23361 A | 1/2006 |
| JP | 2006-201292 A | 8/2006 |
| JP | 2014-102416 A | 6/2014 |
| JP | 2015-11324 A | 1/2015 |
| JP | 2015-166849 A | 9/2015 |
| JP | 2016-61877 A | 4/2016 |
| JP | 2017-32937 A | 2/2017 |
| JP | 2017-142726 A | 8/2017 |
| WO | WO 2014/076897 A1 | 5/2014 |
| WO | WO 2016/114052 A1 | 7/2016 |
| WO | WO 2018/055963 A1 | 3/2018 |
| WO | WO 2018/055964 A1 | 3/2018 |

OTHER PUBLICATIONS

International Preliminary Report on Patentability and Written Opinion of the International Searching Authority for International Application No. PCT/JP2019/043265, dated May 14, 2021, with English translation of the Written Opinion.
International Search Report for International Application No. PCT/JP2019/043265, dated Dec. 24, 2019, with English translation.
Japanese Office Action for Japanese Application No. 2018-207736, dated Aug. 27, 2019, with English translation.

* cited by examiner

PROJECTION LENS AND PROJECTION DEVICE

CROSS-REFERENCE TO RELATED APPLICATIONS

This application is a continuation application of International Application No. PCT/JP2019/043265, filed on Nov. 5, 2019, which is incorporated herein by reference in its entirety. Further, this application claims priority from Japanese Patent Application No. 2018-207736, filed on Nov. 2, 2018, the disclosure of which is incorporated by reference herein in its entirety.

BACKGROUND OF THE INVENTION

Technical Field

The technique of the present disclosure relates to a projection lens and a projection device.

Related Art

A projector as a projection device for projecting an image on a screen has been widely distributed. A projector comprises, for example, an image forming panel (hereinafter, also referred to as an "electro-optical element"), such as a liquid crystal display (LCD) or a digital micromirror device (DMD: registered trademark), and a projection lens that projects the image formed by the image forming panel on a screen.

A projector comprising a projection lens, which can change the projection direction of an image, has been developed as such a projector (see WO2018/055964A). In the projector disclosed in WO2018/055964A, an image forming panel is housed in a body part and a projection lens is mounted on the outer peripheral surface of the body part.

In the projector disclosed in WO2018/055964A, luminous flux representing an image formed by the image forming panel is incident on the projection lens from the body part. The projection lens comprises a bending optical system having three optical axes, that is, a first optical axis, a second optical axis, and a third optical axis in this order from an incident side. The first optical axis is an optical axis corresponding to luminous flux incident from the body part, and the second optical axis is bent at an angle of 90° from the first optical axis. The third optical axis is an emission optical axis which is bent at an angle of 90° from the second optical axis and along which luminous flux is emitted to a screen.

The projection lens includes an incident-side end part, an intermediate part, and an emission-side end part. The incident-side end part corresponds to the first optical axis. The intermediate part corresponds to the second optical axis. The emission-side end part corresponds to the third optical axis. The incident-side end part is non-rotatably mounted on the body part, and the intermediate part is rotated about the first optical axis with respect to the incident-side end part. Since the emission-side end part is connected to the intermediate part, the emission-side end part is also rotated about the first optical axis in a case where the intermediate part is rotated. Further, the emission-side end part is rotated about the second optical axis with respect to the intermediate part. Since the emission-side end part is rotated about the first optical axis and the second optical axis as described above, the projection direction is changed.

Incidentally, in a case where an electric drive unit controlling the drive of a lens or an electric drive unit controlling (locking) rotation for changing a projection direction is provided in the above-mentioned projection lens, there is a possibility that a user comes into contact with the electric drive unit.

SUMMARY

An object of a technique of the disclosure is to provide a projection lens that can change a projection direction, comprises an electric drive unit, and can suppress contact between the electric drive unit and a user, and a projection device comprising the projection lens.

A projection lens according to a technique of the disclosure is mounted on a housing of a projection device including an electro-optical element, and comprises an optical system through which light passes, a second holding unit through which light parallel to a second optical axis passes and which is moved rotationally with respect to the housing, a third holding unit through which light parallel to a third optical axis obtained from bending of the second optical axis passes and which is moved rotationally with respect to the second holding unit, an electric drive unit that electrically controls rotational movement of the second holding unit with respect to the housing, rotational movement of the third holding unit with respect to the second holding unit, or drive of the optical system, and a cover part that covers the electric drive unit.

Further, the projection lens according to the technique of the disclosure may further comprise an emission optical system that is provided in the third holding unit, the electric drive unit may include a first electric drive unit that is provided on the third holding unit, and the cover part may include a first cover part that covers the first electric drive unit.

Furthermore, in the projection lens according to the technique of the disclosure, the electric drive unit may include a second electric drive unit, the projection lens may comprise a first reflective part that is provided in the second holding unit and refracts light parallel to a first optical axis to form the light parallel to the second optical axis, the first optical axis may be an optical axis extending in a first direction, the first direction may include a first 1A direction and a first 1B direction opposite to the first A direction, the light parallel to the first optical axis may travel in the first B direction, the second electric drive unit may be provided on a surface of the second holding unit or the third holding unit, and the second electric drive unit may be closer to one side corresponding to the first A direction than the first reflective part.

Moreover, in the projection lens according to the technique of the disclosure, the second electric drive unit may control rotational movement of the third holding unit with respect to the second holding unit and the second electric drive unit may be provided on a portion of a first outer peripheral surface of the second holding unit overlapping with the third holding unit.

Further, in the projection lens according to the technique of the disclosure, the electric drive unit may include a second electric drive unit, the second electric drive unit may control rotational movement of the third holding unit with respect to the second holding unit, the second electric drive unit may be provided on a first outer peripheral surface of the second holding unit, the cover part may include a second cover part that covers the second electric drive unit, the second cover part may include a first wall portion facing the second electric drive unit and a second wall portion not facing the second electric drive unit, and a distance between the first outer peripheral surface and the first wall portion may be longer than a distance between the first outer peripheral surface and the second wall portion.

Furthermore, the projection lens according to the technique of the disclosure may further comprise a first holding unit through which light parallel to a first optical axis incident from the housing passes and which is connected to the housing and a fourth electric drive unit that controls the drive of the optical system, the second holding unit may be moved rotationally with respect to the first holding unit, the light parallel to the second optical axis may be light obtained from bending of the light parallel to the first optical axis, and the fourth electric drive unit may be provided on the first holding unit.

Moreover, a projection device according to the technique of the disclosure comprises the projection lens.

Further, a projection device according to the technique of the disclosure may comprise the projection lens and the housing and a side surface of the housing may be flush with a side surface of the first cover part.

Furthermore, the projection device according to the technique of the disclosure may further comprise a base portion as the housing, a protruding portion that protrudes from the base portion, and a storage portion that is adjacent to the protruding portion, and the projection lens may be positioned in the storage portion.

According to the disclosure, in a projection lens that can change a projection direction and comprises an electric drive unit, it is possible to suppress contact between the electric drive unit and a user.

DETAILED DESCRIPTION

An example of an embodiment of a technique of the disclosure will be described below with reference to the drawings.

Terms, such as "first", "second", and "third", used in this specification are added to avoid the confusion of components and do not limit the number of components present in a projector or a lens.

Figure 1:
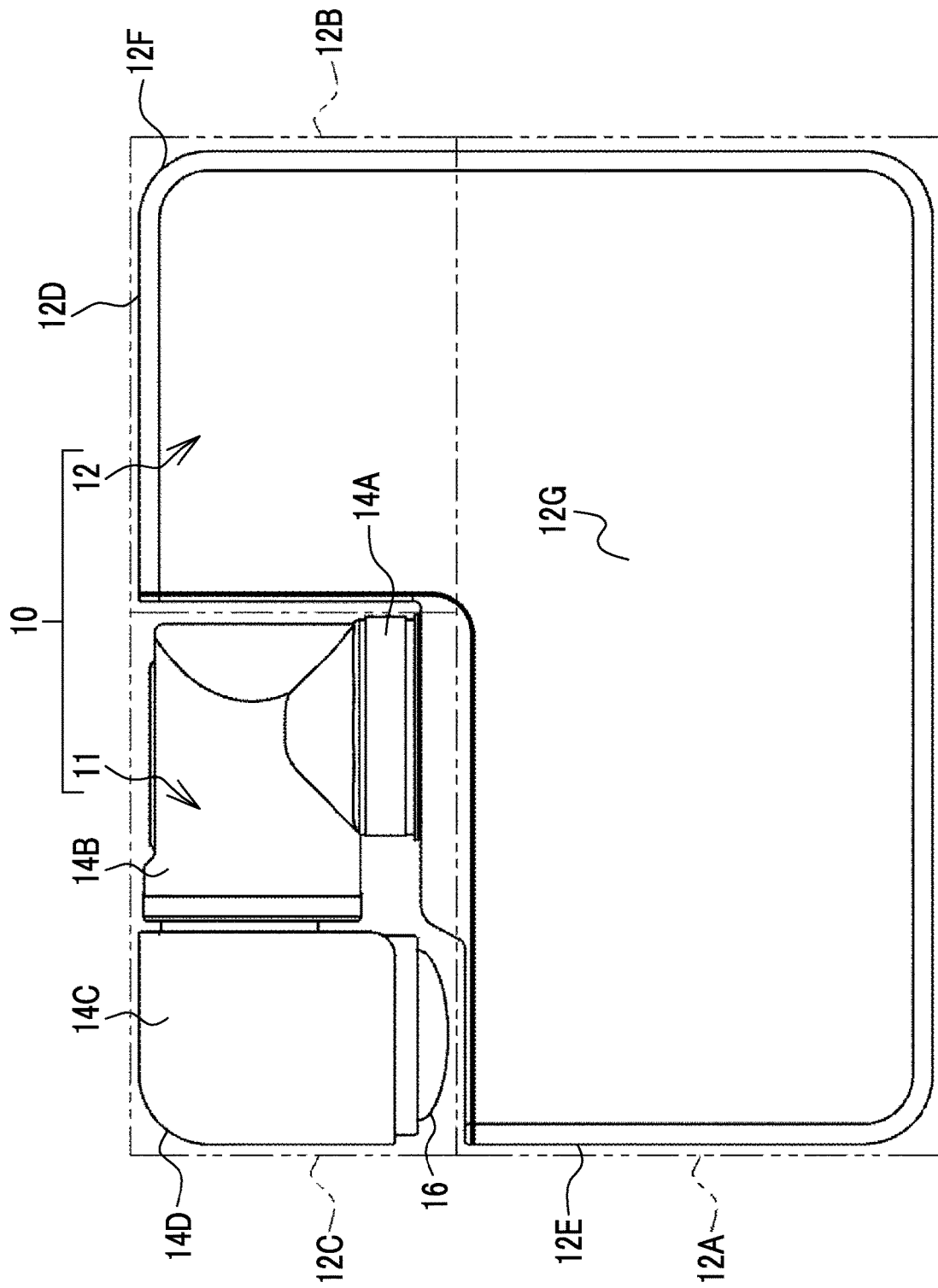
FIG. 1 is a plan view of a projector.

As shown in FIG. 1, a projector 10 according to this embodiment is an example of a "projection device" according to the technique of the disclosure and comprises a projection lens 11 and a body part 12. One end portion of the projection lens 11 is mounted on the body part 12. FIG. 1 shows a storage state where the projection lens 11 is stored in a case where the projector 10 is not in use.

The body part 12 comprises a base portion 12A, a protruding portion 12B, and a storage portion 12C. The base portion 12A houses main components, such as an image forming unit 26 (see FIG. 4) and a control board (not shown).

The protruding portion 12B protrudes from one side of the base portion 12A. The protruding portion 12B has a substantially rectangular shape, and the width of the protruding portion 12B is about a half of the length of one side of the base portion 12A. For this reason, the body part 12 has a substantially L-shape in a plan view as a whole including the base portion 12A and the protruding portion 12B.

The base portion 12A corresponds to a central portion. The base portion 12A has a substantially rectangular shape that is horizontally long in a plan view shown in FIG. 1. An insertion opening 12A1 (see FIG. 6) is formed at the base portion 12A, and a focus adjustment barrel 41E (see FIG. 6) to be described later is inserted into the base portion 12A through the insertion opening 12A1. The storage portion 12C stores the projection lens 11. In FIG. 1, the storage portion 12C is a space formed on the left side of the protruding portion 12B and has a substantially rectangular shape in a plan view like the protruding portion 12B. That is, it is assumed that a side surface 12D provided on the upper side and a side surface 12E provided on the left side in FIG. 1 among the outer peripheral surfaces of the body part 12 extend in directions where the side surface 12D and the side surface 12E cross each other. A space, which is defined using the respective extending side surfaces 12D and 12E as outer edges, is the storage portion 12C. For this reason, the body part 12 has a substantially L-shape by itself, but has a substantially rectangular shape in a plan view as a whole including the storage portion 12C. Since the storage portion 12C can also be regarded as a portion depressed toward the base portion 12A from the height of the protruding portion 12B in a case where the projector 10 is vertically placed, the storage portion 12C corresponds to a depressed portion.

In a case where the projector 10 is not in use, the projection lens 11 is stored in the storage portion 12C after being transformed not to protrude from the rectangular storage portion 12C. For this reason, since the projector 10 has a substantially rectangular parallelepiped shape as a whole in which the L-shaped body part 12 and the projection lens 11 are combined with each other, the unevenness of the outer peripheral surfaces is reduced in the storage state as shown in FIG. 1. Accordingly, it is easy to carry and store the projector 10 in the storage state.

Luminous flux representing an image formed by the image forming unit 26 is incident on the projection lens 11 from the body part 12. The projection lens 11 enlarges image light, which is based on the incident luminous flux, by an optical system and forms an image. Accordingly, the projection lens 11 projects the enlarged image of the image, which is formed by the image forming unit 26, on a screen 36 (see FIG. 4).

Since the projection lens 11 includes a bending optical system (see FIGS. 2 and 3) for bending an optical axis twice by way of example, the projection lens 11 has a substantially U-shape convex upward as a whole in the storage state shown in FIG. 1. The projection lens 11 comprises an incident-side end part 14A, an intermediate part 14B, and an emission-side end part 14C. The incident-side end part 14A is connected to one end of both ends of the intermediate part 14B, and the emission-side end part 14C is connected to the other end of both ends of the intermediate part 14B. Light emitted from the body part 12 is incident on the incident-side end part 14A. The emission-side end part 14C is provided with an emission lens 16. Light, which is incident on the incident-side end part 14A from the body part 12, is guided to the emission-side end part 14C through the intermediate part 14B. The emission-side end part 14C emits light, which is guided from the body part 12 through the incident-side end part 14A and the intermediate part 14B, to the screen 36 from the emission lens 16.

The incident-side end part 14A is mounted on the body part 12 and includes a first holding unit 15A (see FIG. 6), which will be described later, therein. The mounting position of the incident-side end part 14A is a position adjacent to the protruding portion 12B in a horizontal direction in FIG. 1, and is positioned near the middle of the base portion 12A. In the storage state of the projection lens 11, the intermediate part 14B extends from near the middle of the base portion 12A toward an end portion thereof opposite to the protruding portion 12B, that is, the left side in FIG. 1. Further, the intermediate part 14B includes a second holding unit 15B (see FIG. 6), which will be described later, therein. A corner 14D of the emission-side end part 14C and a corner 12F of the protruding portion 12B are disposed at positions that are substantially symmetric with each other in the horizontal direction in FIG. 1. The emission-side end part 14C includes a third holding unit 15C (see FIG. 6), which will be described later, therein.

Since the appearance of the emission-side end part 14C is formed in substantially the same shape as the appearance of the protruding portion 12B, the appearance of the projection lens 11 and the appearance of the body part 12 are caused to have unity. For this reason, the appearance of the projection lens 11 is designed as if the appearance of the projection lens 11 forms a part of the appearance of the body part 12 in the storage state.

Figure 3:
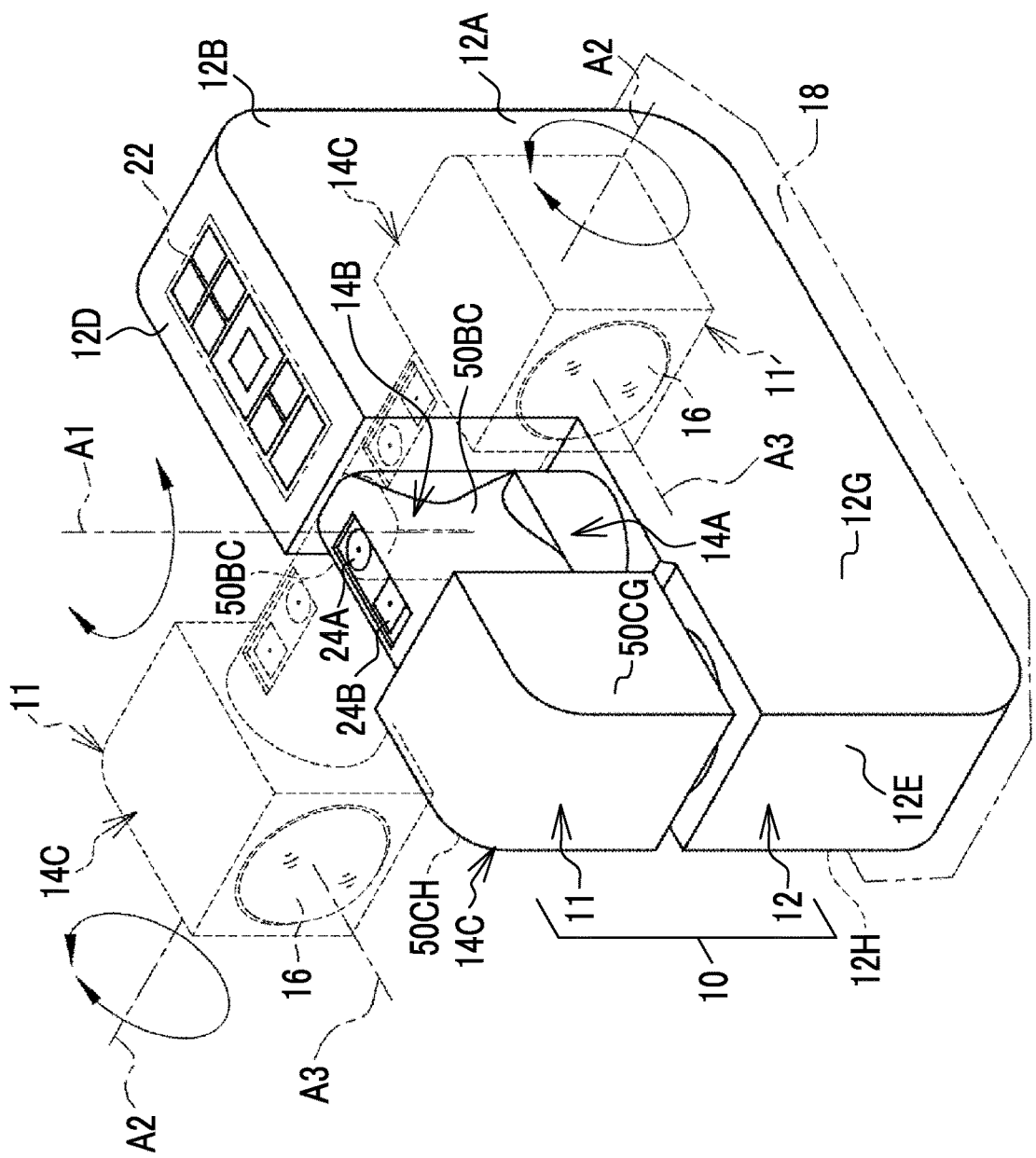
FIG. 3 is a perspective view of the vertically placed projector.
Figure 5:
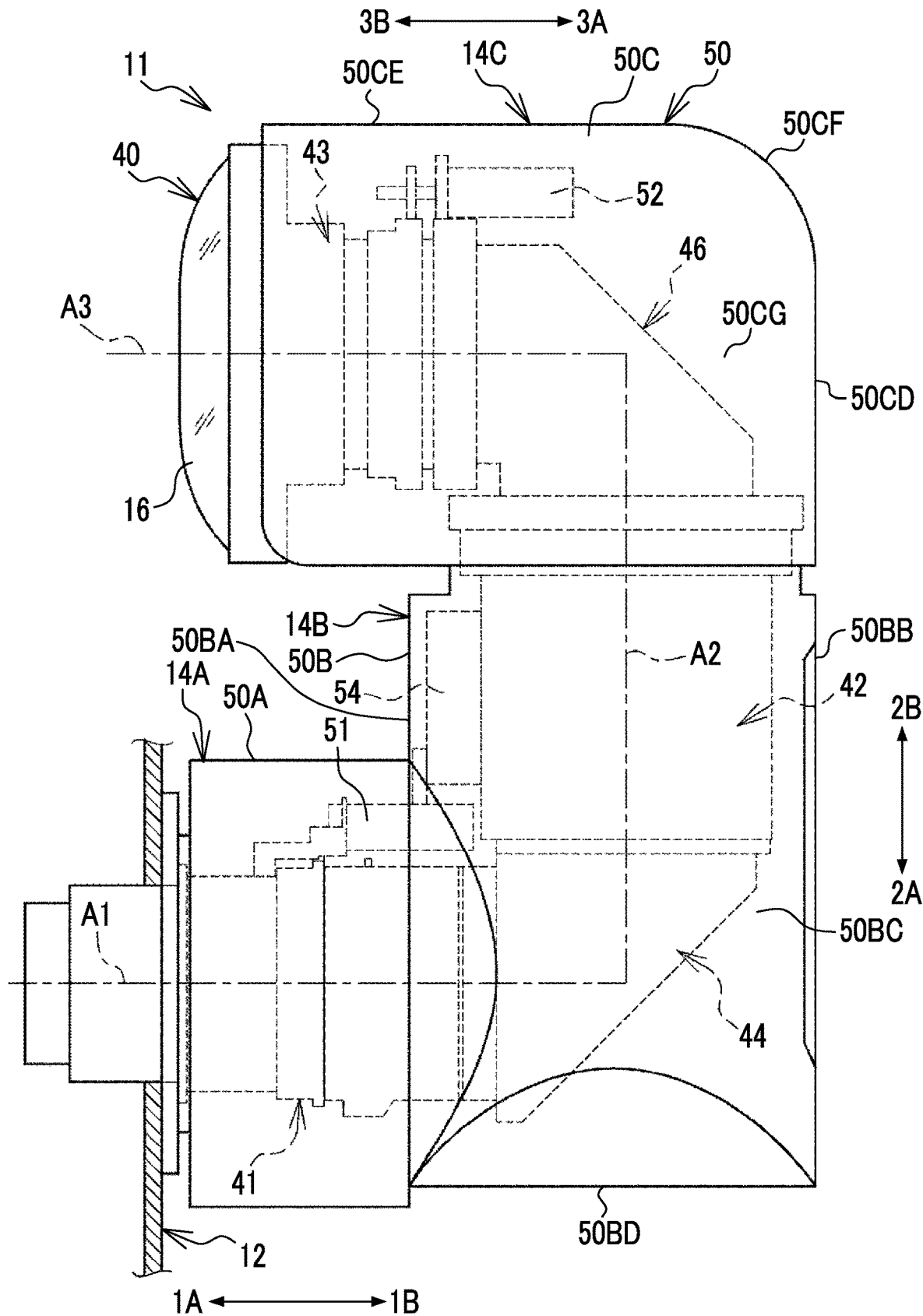
FIG. 5 is a side view of a projection lens.

The appearance of the emission-side end part 14C is formed by a third exterior cover 50C (see FIG. 5) to be described later. As shown in FIG. 5, the third exterior cover 50C includes a side surface 50CD corresponding to the side surface 12D of the body part 12 and side surface 50CE corresponding to the side surface 12E. In the storage state, the side surface 50CD of the third exterior cover 50C is flush with the side surface 12D of the body part 12 and the side surface 50CE is flush with the side surface 12E of the body part 12. Further, as shown in FIG. 3, the third exterior cover 50C includes a surface 50CG corresponding to a surface 12G of the body part 12 and a back 50CH corresponding to a back 12H of the body part 12. In the storage state, the surface 50CG of the third exterior cover 50C is flush with the surface 12G of the body part 12 and the back 50CH is flush with the back 12H of the body part 12. A corner surface 50CF corresponding to the above-mentioned corner 14D is formed between the side surfaces 50CD and 50CE of the third exterior cover 50C.

Figure 2:
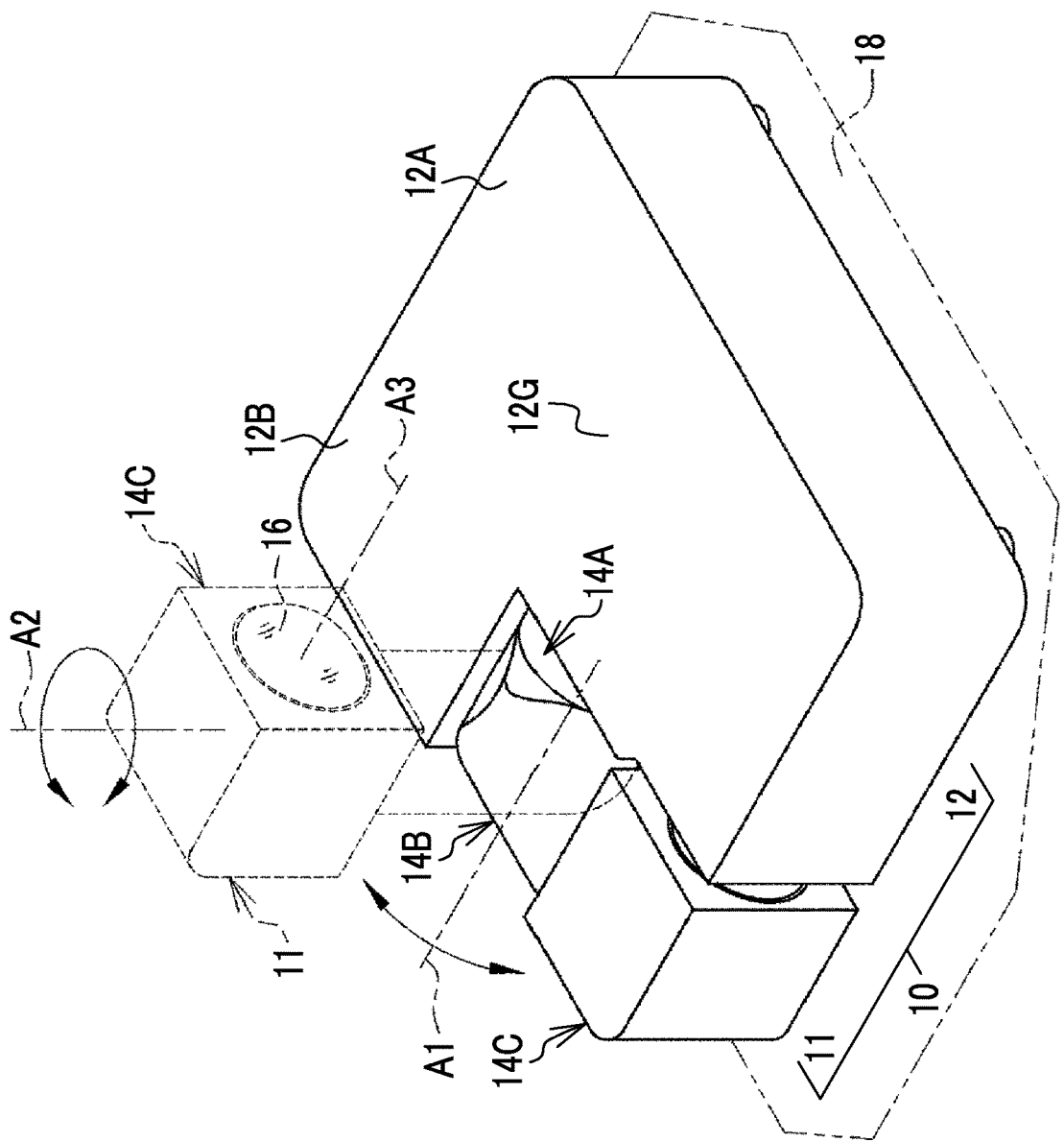
FIG. 2 is a perspective view of the horizontally placed projector.

As shown in FIGS. 2 and 3, the projection lens 11 comprises the bending optical system. The bending optical system has a first optical axis A1, a second optical axis A2, and a third optical axis A3. The second optical axis A2 is an optical axis that is bent at an angle of 90° from the first optical axis A1. The third optical axis A3 is an optical axis that is bent at an angle of 90° from the second optical axis A2.

The incident-side end part 14A is non-rotatably mounted on the body part 12. The intermediate part 14B is rotatable about the first optical axis A1 with respect to the incident-side end part 14A. Since the emission-side end part 14C is connected to the intermediate part 14B, the emission-side end part 14C is also rotated about the first optical axis A1 in a case where the intermediate part 14B is rotated with respect to the incident-side end part 14A. A rotatable range about the first optical axis A1 is less than 360°, and is 180° in this example. The reason why the rotatable range about the first optical axis A1 is limited to less than 360° is to prevent interference between the protruding portion 12B and the projection lens 11 in a state where the protruding portion 12B is adjacent to the incident-side end part 14A.

Further, the emission-side end part 14C is rotatable about the second optical axis A2 with respect to the intermediate part 14B. The rotation of the emission-side end part 14C about the second optical axis A2 is not limited unlike the case of the intermediate part 14B. For example, the emission-side end part 14C can also be rotated at an angle of 360° or more.

In summary, the emission-side end part 14C is rotatable about two axes, which are the first optical axis A1 and the second optical axis A2, as rotation axes. Accordingly, a user can change the projection direction of the projection lens 11 without moving the body part 12.

FIG. 2 shows a state where the projector 10 is horizontally placed on an installation surface 18, and FIG. 3 shows a state where the projector 10 is vertically placed on the installation surface 18. As described above, the projector 10 can be used in a horizontal attitude and a vertical attitude.

As shown in FIG. 3, an operation panel 22 is provided on the side surface 12D of the protruding portion 12B. The operation panel 22 includes a plurality of operation switches. The operation switches are, for example, a power switch, adjustment switches, and the like. The adjustment switches are switches that are used to perform various adjustments. The adjustment switches include, for example, switches that are used to perform the image quality adjustment and keystone correction of an image projected on the screen 36.

A first unlock switch 24A and a second unlock switch 24B are provided on one surface (the outer surface of a first B wall 50BB of a second exterior cover 50B to be described later, see FIG. 5) of the intermediate part 14B. As described later, the projection lens 11 is provided with a first rotation locking mechanism (see a solenoid 53 of FIG. 6) that locks the rotation of the intermediate part 14B about the first optical axis A1 with respect to the incident-side end part 14A and a second rotation locking mechanism (see a solenoid 54 of FIG. 6) that locks the rotation of the emission-side end part 14C about the second optical axis A2 with respect to the intermediate part 14B. The first unlock switch 24A is an operation switch that inputs an instruction to unlock the rotation of the intermediate part 14B to the first rotation locking mechanism, and the second unlock switch 24B is an operation switch that inputs an instruction to unlock the rotation of the emission-side end part 14C to the second rotation locking mechanism.

Figure 4:
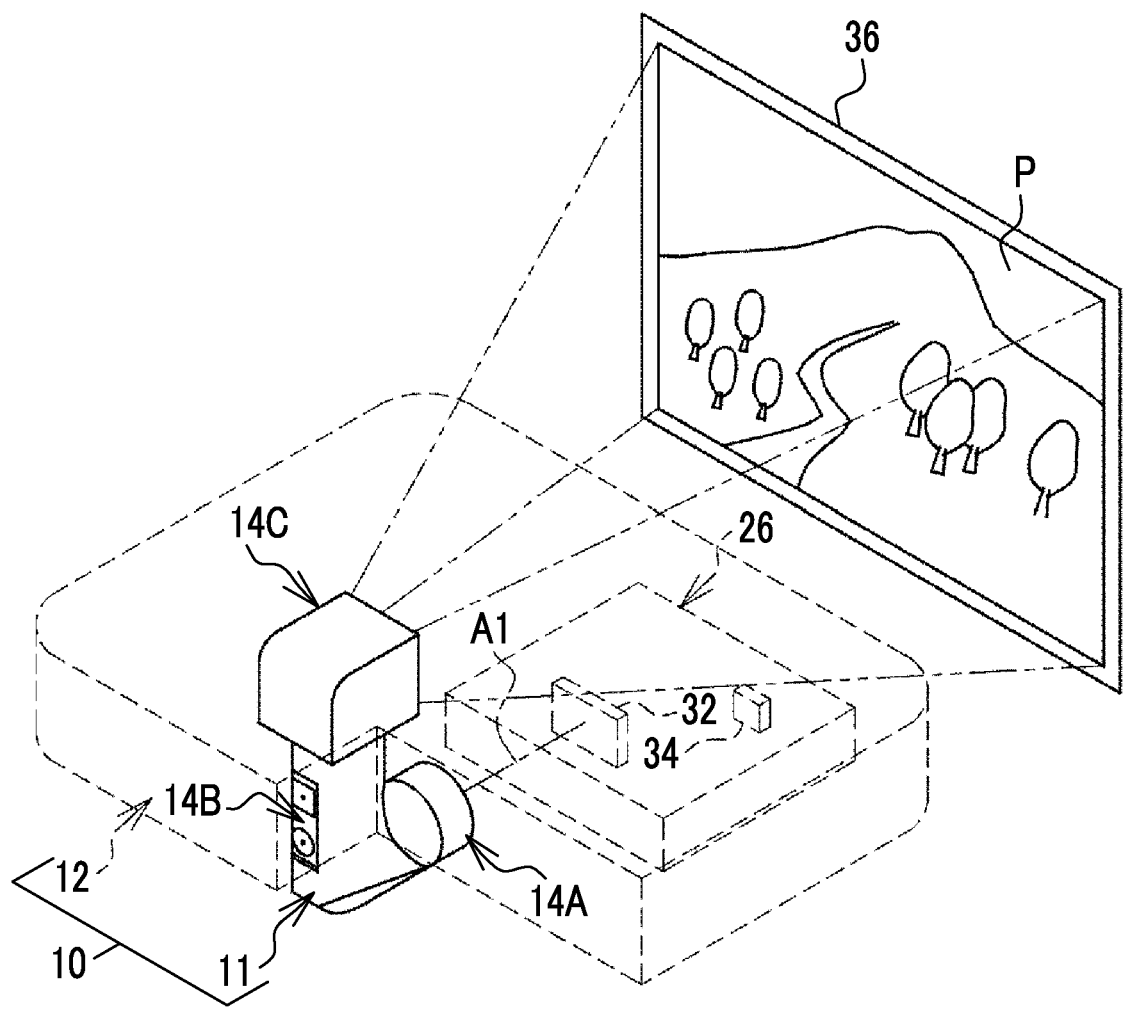
FIG. 4 is a diagram showing an aspect where the projector is used to project an image on a screen.

As shown in FIG. 4, the body part 12 is provided with the image forming unit 26. The image forming unit 26 forms an image to be projected. The image forming unit 26 comprises an image forming panel 32, a light source 34, a light guide member (not shown), and the like. The light source 34 applies light to the image forming panel 32. The light guide member guides light, which is applied from the light source 34, to the image forming panel 32. The image forming unit 26 is, for example, a reflection type image forming unit that uses a DMD as the image forming panel 32. As well known, the DMD is an image display element which includes a plurality of micro-mirrors capable of changing the reflection direction of light applied from the light source 34 and in which the respective micro-mirrors are two-dimensionally arranged in pixels. The DMD performs optical modulation corresponding to an image by changing the direction of each micro-mirror according to an image to switch the ON/OFF of reflected light of light applied from the light source 34.

Examples of the light source 34 include a white light source. The white light source emits white light. The white light source is, for example, a light source that is realized from the combination of a laser light source and a phosphor. The laser light source emits blue light to the phosphor as excitation light. The phosphor emits yellow light in a case where the phosphor is excited by blue light emitted from the laser light source. The white light source emits white light by combining blue light that is emitted from the laser light source with yellow light that is emitted from the phosphor. The image forming unit 26 is further provided with a rotary color filter that selectively converts white light emitted from the light source 34 into each of blue light B (Blue), green light G (Green), and red light R (Red) in a time-sharing manner. In a case where each of blue light B, green light G, and red light R is selectively applied to the image forming panel 32, image light where image information about each of blue light B, green light G, and red light R is carried and supported is obtained. In a case where each color image light obtained in this way is selectively incident on the projection lens 11, each color image light is projected toward the screen 36. The respective color image lights are integrated with each other on the screen 36, so that a full color image P is displayed on the screen 36.

Figure 6:
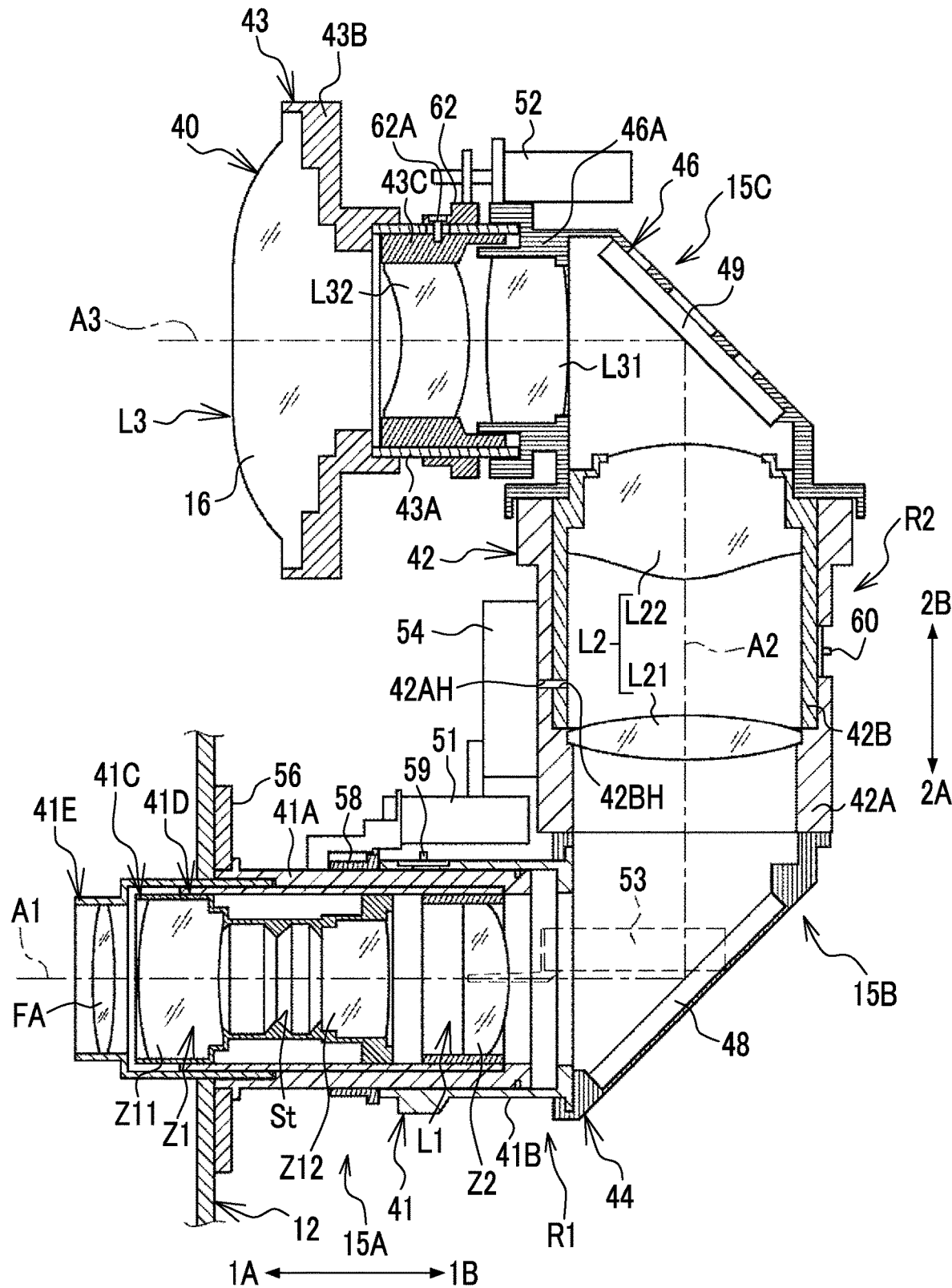
FIG. 6 is a longitudinal sectional view of the projection lens (an exterior cover is omitted).

As shown in FIGS. 5 and 6, the projection lens 11 comprises a lens barrel 40. The lens barrel 40 houses the bending optical system. The lens barrel 40 comprises a first lens barrel unit 41, a second lens barrel unit 42, and a third lens barrel unit 43.

Each of the first lens barrel unit 41, the second lens barrel unit 42, and the third lens barrel unit 43 houses lenses. The lenses housed in the first lens barrel unit 41 are disposed on the first optical axis A1. The lenses housed in the second lens barrel unit 42 are disposed on the second optical axis A2. The lenses housed in the third lens barrel unit 43 are disposed on the third optical axis A3. The central axis of the first lens barrel unit 41 substantially coincides with the first optical axis A1. The central axis of the second lens barrel unit 42 substantially coincides with the second optical axis A2. The central axis of the third lens barrel unit 43 substantially coincides with the third optical axis A3. FIGS. 5 and 6 show the lens barrel 40 in the state shown in FIGS. 2 and 4. In this embodiment, in order to simplify description, the detailed configuration of the respective lenses will be omitted and the respective lenses will be represented like one lens. However, each lens may be a plurality of lenses.

The first lens barrel unit 41 is a lens barrel unit that is positioned closest to the incident side, the third lens barrel unit 43 is a lens barrel unit that is positioned closest to the emission side, and the second lens barrel unit 42 is a lens barrel unit that is positioned between the first lens barrel unit 41 and the third lens barrel unit 43.

In addition, the lens barrel 40 comprises a first mirror holding part 44 and a second mirror holding part 46. The first mirror holding part 44 holds a first mirror 48 and the second mirror holding part 46 holds a second mirror 49. Each of the first and second mirrors 48 and 49 is one of optical elements forming the bending optical system and is a reflective part that bends an optical axis. The first mirror 48 bends the first optical axis A1 to form the second optical axis A2. That is, the first mirror 48 refracts light parallel to the first optical axis A1 to form light parallel to the second optical axis. The second mirror 49 bends the second optical axis A2 to form the third optical axis A3. The first mirror holding part 44 is disposed between the first lens barrel unit 41 and the second lens barrel unit 42. The second mirror holding part 46 is disposed between the second lens barrel unit 42 and the third lens barrel unit 43.

A distal end portion of an inner barrel 42B of the second lens barrel unit 42 and a lens L22 held at the distal end portion are put into the second mirror holding part 46. Accordingly, since a distance between the lens L22 and the second mirror 49 is reduced, light emitted from the lens L22 can be reflected even though the second mirror 49 is reduced in size. Further, the second mirror holding part 46 can also be reduced in size together with a reduction in the size of the second mirror 49.

The lens barrel 40 is covered with an exterior cover 50 except for a part of the emission lens 16 and the like. The exterior cover 50 includes a first exterior cover 50A, a second exterior cover 50B, and a third exterior cover 50C. The first exterior cover 50A is an exterior cover corresponding to the incident-side end part 14A, the second exterior cover 50B is an exterior cover corresponding to the intermediate part 14B, and the third exterior cover 50C is an exterior cover corresponding to the emission-side end part 14C.

The first exterior cover 50A covers the first lens barrel unit 41 and forms the outer peripheral surface of the incident-side end part 14A. The second exterior cover 50B mainly covers the first mirror holding part 44 and the second lens barrel unit 42, and forms the outer peripheral surface of the intermediate part 14B. The third exterior cover 50C mainly covers the second mirror holding part 46 and the third lens barrel unit 43, and forms the outer peripheral surface of the emission-side end part 14C.

Further, various actuators are disposed on the outer peripheral surface of the lens barrel 40. Specifically, a zoom motor 51 is provided on the outer peripheral surface of the first lens barrel unit 41 and a focus motor 52 is provided on the outer peripheral surface of the second mirror holding part 46. Further, a solenoid 53 (see FIG. 6) is provided on the outer peripheral surface of the first mirror holding part 44, and a solenoid 54 is provided on the outer peripheral surface of the second lens barrel unit 42. The solenoid 53 forms the first rotation locking mechanism. The solenoid 54 forms the second rotation locking mechanism. The zoom motor 51, the focus motor 52, the solenoid 53, and the solenoid 54 are examples of electric drive units.

In FIG. 6, the first lens barrel unit 41 comprises an inner barrel 41A, an outer barrel 41B, a zoom lens barrel 41C, and a cam barrel 41D. A focus adjustment barrel 41E is attachably and detachably mounted on the first lens barrel unit 41. In the first lens barrel unit 41, a flange 56, which protrudes outward in the radial direction of the inner barrel 41A, is provided at an incident-side end portion of the inner barrel 41A on the first optical axis A1. Since the flange 56 is fixed to the body part 12 so that the inner barrel 41A is not rotatable, the first lens barrel unit 41 is connected to the body part 12. The outer barrel 41B is disposed on the emission side of the inner barrel 41A, and covers a part of the outer peripheral surface of the inner barrel 41A. The outer barrel 41B is mounted on the inner barrel 41A so as to be rotatable about the first optical axis A1.

That is, a first rotational movement unit R1 is formed as a support member in a case where the outer barrel 41B is rotated about the first optical axis A1 with respect to the inner barrel 41A. Specifically, the first rotational movement unit R1 comprises, for example, a groove (not shown) that is formed in a circumferential shape on the outer peripheral surface of the inner barrel 41A, and a roller (not shown) that is formed on the inner peripheral surface of the outer barrel 41B. Further, in a case where the inner barrel 41A is moved rotationally with respect to the outer barrel 41B, the roller of the outer barrel 41B is moved rotationally along the groove of the inner barrel 41A. For this reason, the first rotational movement unit R1 serves as a support member for the rotational movement of both barrel members.

The first lens barrel unit 41 holds a first optical system L1. The first optical system L1 is composed of, for example, a lens FA, a lens group Z1, and a lens Z2 and is disposed on the first optical axis A1. The lens group Z1 is composed of a lens Z11 and a lens Z12. The cam barrel 41D and the zoom lens barrel 41C are housed in the inner barrel 41A. The zoom lens barrel 41C holds two groups of zoom lenses. The two groups of zoom lenses are composed of the lens group Z1 and the lens Z2.

A first cam groove (not shown) and a second cam groove (not shown) are formed on the cam barrel 41D. The first cam groove is a cam groove that is used to move the lens group Z1. The second cam groove is a cam groove that is used to move the lens Z2. A lens holding frame of the lens group Z1 is provided with a first cam pin (not shown). A lens holding frame of the lens Z2 is provided with a second cam pin (not shown). The first cam pin is inserted into the first cam groove and the second cam pin is inserted into the second cam groove.

In a case where the cam barrel 41D is rotated about the first optical axis A1, the lens group Z1 is moved along the first cam groove and the first optical axis A1 and the lens Z2 is moved along the second cam groove and the first optical axis A1. In a case where the lens group Z1 and the lens Z2 are moved along the first optical axis A1 as described above, the position of the lens group Z1 on the first optical axis is changed, the position of the lens Z2 on the first optical axis A1 is changed, and an interval between the lens group Z1 and the lens Z2 is changed. Accordingly, zooming is performed.

The cam barrel 41D is rotated by the drive of the zoom motor 51. A cylindrical gear 58 is provided on the outside of the inner barrel 41A. The gear 58 is rotated around the inner barrel 41A by the drive of the zoom motor 51. The gear 58 is provided with a drive pin (not shown) that is used to rotate the cam barrel 41D. In a case where the gear 58 is rotated, the drive pin is also rotated in the circumferential direction of the inner barrel 41A and the cam barrel 41D is rotated as the drive pin is rotated. In order to prevent interference with the drive pin, an insertion groove (not shown) into which the drive pin is to be inserted is formed on the inner barrel 41A in the circumferential direction.

Further, a stationary stop St is provided between the lenses Z11 and Z12 in the zoom lens barrel 41C. The stationary stop St narrows luminous flux incident from the body part 12. Since the stationary stop St is provided in the zoom lens barrel 41C, a telecentric optical system in which the size of an image is not changed at the center and the periphery of an image forming plane regardless of the incident height of luminous flux is realized.

The focus adjustment barrel 41E is mounted on the incident-side end portion of the inner barrel 41A and is rotatable about the first optical axis A1 with respect to the inner barrel 41A. A thread groove is formed on each of the outer peripheral surface of an emission-side end portion of the focus adjustment barrel 41E and the inner peripheral surface of the inner barrel 41A, and the respective thread grooves mesh with each other. Since the inner barrel 41A is fixed to the body part 12, the focus adjustment barrel 41E is moved along the first optical axis A1 due to the action of threads in a case where the focus adjustment barrel 41E is rotated with respect to the inner barrel 41A.

The focus adjustment barrel 41E holds a lens FA for adjusting a focus. The lens FA is moved along the first optical axis A1 to adjust the relative position of the focusing position of the entire system of the projection lens 11 relative to the image forming panel 32. In a case where the projection lens 11 is mounted on the body part 12, an individual difference occurs in the mounting position of the projection lens 11 relative to the image forming panel 32. The focus adjustment barrel 41E is provided to absorb this individual difference occurring during manufacture so that the relative position of the focusing position of the entire system of the projection lens 11 relative to the image forming panel 32 is substantially constant.

A first rotational position detection sensor 59 is provided on the outer peripheral surface of the outer barrel 41B. The first rotational position detection sensor 59 detects the rotational position of the outer barrel 41B with respect to the inner barrel 41A.

The first mirror holding part 44 is integrally mounted on an emission-side end portion of the outer barrel 41B. For this reason, the first mirror holding part 44 is rotated about the first optical axis A1 as the outer barrel 41B is rotated about the first optical axis A1 with respect to the inner barrel 41A. The first mirror holding part 44 holds the first mirror 48 in an attitude where the reflective surface of the first mirror 48 forms an angle of 45° with respect to each of the first optical axis A1 and the second optical axis A2. The first mirror 48 is a specular reflection mirror of which a transparent member, such as glass, is coated with a reflective film.

The second lens barrel unit 42 comprises an outer barrel 42A and an inner barrel 42B. An incident-side end portion of the outer barrel 42A is integrally mounted on the first mirror holding part 44. The inner barrel 42B is mounted on the outer barrel 42A so as to be rotatable about the second optical axis A2. That is, a second rotational movement unit R2 is formed as a support member in a case where the inner barrel 42B is rotated about the second optical axis A2 with respect to the outer barrel 42A. The structure of the second rotational movement unit R2 is substantially the same as the structure of the first rotational movement unit R1.

The second lens barrel unit 42 holds a second optical system L2. The second optical system L2 is composed of, for example, a lens L21 and a lens L22 and is disposed on the second optical axis A2. The outer barrel 42A holds the lens L21. The inner barrel 42B holds the lens L22.

In this example, the second optical system L2 functions as a relay lens. More specifically, the first optical system L1 of the first lens barrel unit 41 forms an intermediate image in the first mirror holding part 44. The second optical system L2 uses this intermediate image as a subject and relays luminous flux representing the intermediate image to the second mirror holding part 46 and the third lens barrel unit 43.

The second mirror holding part 46 is integrally mounted on an emission-side end portion of the inner barrel 42B of the second lens barrel unit 42. For this reason, the second mirror holding part 46 is rotated about the second optical axis A2 as the inner barrel 42B is rotated about the second optical axis A2 with respect to the outer barrel 42A.

A second rotational position detection sensor 60 is provided on the outer peripheral surface of the outer barrel 42A. The second rotational position detection sensor 60 detects the rotational position of the inner barrel 42B with respect to the outer barrel 42A.

The second mirror holding part 46 holds the second mirror 49 in an attitude where the reflective surface of the second mirror 49 forms an angle of 45° with respect to each of the second optical axis A2 and the third optical axis A3. The second mirror 49 is the same specular reflection mirror as the first mirror 48.

An emission-side end portion 46A of the second mirror holding part 46 forms the third lens barrel unit 43. The third lens barrel unit 43 comprises a stationary barrel 43A, an emission lens holding frame 43B, and a focus lens barrel 43C in addition to the end portion 46A.

The third lens barrel unit 43 holds a third optical system L3. The third optical system L3 is an emission optical system, is composed of, for example, a lens L31, a lens L32, and the emission lens 16, and is disposed on the third optical axis A3. The end portion 46A is a tubular portion of which the central axis substantially coincides with the third optical axis A3, and functions as a lens holding frame that holds the lens L31.

The stationary barrel 43A is integrally mounted on the emission side of the end portion 46A. The emission lens holding frame 43B is integrally mounted on an emission-side end portion of the stationary barrel 43A. The stationary barrel 43A holds the focus lens barrel 43C on the inner peripheral side thereof so that the focus lens barrel 43C is movable in the direction of the third optical axis A3. The focus lens barrel 43C holds the lens L32 for focus.

A gear 62 is provided on the outer periphery of the stationary barrel 43A. The gear 62 is rotated in the circumferential direction of the stationary barrel 43A by the drive of the focus motor 52. A thread groove is formed on the inner peripheral surface of the gear 62. A thread groove is formed even on the outer peripheral surface of the stationary barrel 43A. The thread groove formed on the inner peripheral surface of the gear 62 and the thread groove formed on the outer peripheral surface of the stationary barrel 43A mesh with each other. For this reason, in a case where the gear 62 is rotated, the gear 62 is moved with respect to the stationary barrel 43A in the direction of the third optical axis A3. The gear 62 is provided with a drive pin 62A, and the drive pin 62A is inserted into the focus lens barrel 43C. Accordingly, as the gear 62 is moved, the focus lens barrel 43C is also moved along the third optical axis A3. A focusing position depending on a distance between the screen 36 and the projection lens 11 is adjusted as the reduction-side focusing position of the projection lens 11 by the movement of the focus lens barrel 43C.

Portions of the first lens barrel unit 41 except for the outer barrel 41B, that is, the inner barrel 41A, the zoom lens barrel 41C, the cam barrel 41D, and the focus adjustment barrel 41E of the first lens barrel unit 41 are not rotatable with respect to the body part 12 and correspond to the first holding unit 15A.

The outer barrel 41B of the first lens barrel unit 41, the first mirror holding part 44, and the outer barrel 42A of the second lens barrel unit 42 are rotatable about the first optical axis A1 with respect to the body part 12 and the first holding unit 15A, and correspond to the second holding unit 15B.

The inner barrel 42B of the second lens barrel unit 42, the second mirror holding part 46, and the stationary barrel 43A, the emission lens holding frame 43B, and the focus lens barrel 43C of the third lens barrel unit 43 are adapted to be rotatable about the third optical axis A3 with respect to the second holding unit 15B, and correspond to the third holding unit 15C.

Further, the first holding unit 15A, the second holding unit 15B, and the third holding unit 15C hold various optical systems, reflective parts, electric drive units, and the like of the projection lens 11.

Hereinafter, a direction along which the first optical axis A1 follows is referred to as a first direction, a direction in which light parallel to the first optical axis A1 travels with regard to the first direction is referred to as a first B direction, and a direction opposite thereto is referred to a first A direction.

A direction along which the second optical axis A2 follows is referred to as a second direction, a direction in which light parallel to the second optical axis A2 travels with regard to the second direction is referred to as a second 2B direction, and a direction opposite thereto is referred to a second 2A direction.

A direction along which the third optical axis A3 follows is referred to as a third direction, a direction in which light parallel to the third optical axis A3 travels with regard to the third direction is referred to as a third 3B direction, and a direction opposite thereto is referred to a third 3A direction.

Accordingly, the first direction is a direction determined with reference to the body part 12, but the second and third directions can be said as directions to which the direction may be changed with reference to the body part 12.

In a case where the projection lens 11 is in a position where the projection lens 11 is stored in the body part 12 (see FIG. 1), a position where the zoom motor 51 (corresponding to a fourth electric drive unit) is disposed is on one side (the upper side in FIG. 6) of the first lens barrel unit 41 opposite to the protruding portion 12B. In other words, the zoom motor 51 is positioned on one side of the first holding unit 15A opposite to the protruding portion 12B. For this reason, an electric drive unit does not need to be disposed between the first holding unit 15A and the protruding portion 12B and the first holding unit 15A can be disposed close to the protruding portion 12B. Accordingly, since the storage portion 12C storing the projection lens 11 is increased in size, the projection lens 11 can be increased in size.

Further, a member to which the zoom motor 51 is fixed is the inner barrel 41A of the first lens barrel unit 41, that is, the first holding unit 15A. The first holding unit 15A is connected to the body part 12 of the projection device. Accordingly, the zoom motor 51 forms the incident-side end part 14A, and is adapted not to be rotated through rotation caused by the first rotational movement unit R1. That is, since the zoom motor 51 is not moved rotationally through the rotational movement of the first rotational movement unit R1, the first exterior cover 50A (third cover part) covering the zoom motor 51 does not need to be large.

The solenoid 53 (corresponding to a third electric drive unit) is an electric drive unit that restricts the rotation of the outer barrel 41B with respect to the inner barrel 41A of the first lens barrel unit 41. In other words, the solenoid 53 forms the first rotation locking mechanism that locks (restricts) rotation caused by the first rotational movement unit R1. Specifically, in a case where a plunger (not shown) of the solenoid 53 is engaged with both engaging portions (not shown) formed at the respective inner and outer barrels 41A and 41B of the first lens barrel unit 41, the rotation of the outer barrel 41B with respect to the inner barrel 41A is restricted. Further, in a case where the plunger is disengaged, the rotation of the outer barrel 41B with respect to the inner barrel 41A is allowed.

The solenoid 54 (corresponding to a second electric drive unit) is an electric drive unit that restricts the rotation of the inner barrel 42B with respect to the outer barrel 42A of the second lens barrel unit 42. In other words, the solenoid 54 forms the second rotation locking mechanism that locks (restricts) rotation caused by the second rotational movement unit R2. Specifically, in a case where a plunger (not shown) of the solenoid 54 is inserted into holes 42AH and 42BH formed at the respective inner and outer barrels 42B and 42A of the second lens barrel unit 42, the rotation of the inner barrel 42B with respect to the outer barrel 42A is restricted. Further, in a case where the plunger of the solenoid 54 is pulled out of at least the hole 42BH of the inner barrel 42B, the rotation of the inner barrel 42B with respect to the outer barrel 42A is allowed.

A position where the solenoid 54 is disposed is on the surface of the outer barrel 42A of the second lens barrel unit 42 corresponding to the first A direction. In other words, the position where the solenoid 54 is disposed is on one side of the second holding unit 15B facing the base portion 12A of the body part 12 (the first A direction). For this reason, the solenoid 54 is closer to the side corresponding to the first A direction than the first mirror 48. In other words, the solenoid 54 faces the body part 12 in the storage state shown in FIG. 1. Since the solenoid 54 is present at such a position, contact between a user and the solenoid 54 or impact applied to the solenoid 54 from the outside is suppressed.

More specifically, a position where the solenoid 54 is provided is at a position where the inner and outer barrels 42B and 42A of the second lens barrel unit 42 overlap with each other in the second direction (a portion where both the inner and outer barrels 42B and 42A are present in the second direction). As shown in FIG. 6, at least a part of the solenoid 54 is disposed at a portion where the inner and outer barrels 42B and 42A of the second lens barrel unit 42 overlap with each other.

Further, a member to which the solenoid 54 is fixed is the outer barrel 42A of the second lens barrel unit 42, and is the second holding unit 15B. In other words, the solenoid 54 forms the intermediate part 14B. Accordingly, the solenoid 54 is not rotated even though rotation caused by the second rotational movement unit R2 is performed.

Furthermore, the focus motor 52 (corresponding to a first electric drive unit) is fixed to one side of the emission-side end portion 46A of the second mirror holding part 46 corresponding to the second B direction. Accordingly, the focus motor 52 is positioned on one side of the third holding unit 15C corresponding to the second B direction.

As shown in FIG. 5, the third exterior cover 50C covers the focus motor 52 and corresponds to a first cover part. Further, the third exterior cover 50C covers not only the focus motor 52 but also the second mirror holding part 46, the third lens barrel unit 43, and the like. Furthermore, the third exterior cover 50C forms the outer peripheral surface of the emission-side end part 14C. Accordingly, the focus motor 52 positioned in the emission-side end part 14C, which easily comes into contact with a user, is covered with the third exterior cover 50C.

The second exterior cover 50B covers the solenoids 53 and 54, and corresponds to a second cover part. Further, the second exterior cover 50B also covers substantially the entirety of the second lens barrel unit 42 and the first mirror holding part 44. Accordingly, the second exterior cover 50B forms the outer peripheral surface of the intermediate part 14B. Furthermore, the second exterior cover 50B covers a part of the zoom motor 51.

The second exterior cover 50B forms the intermediate part 14B, and is rotated with rotation caused by the first rotational movement unit R1 but is not moved with respect to rotation caused by the second rotational movement unit R2.

The second exterior cover 50B includes a first A wall 50BA (first wall portion) that forms the outer peripheral surface of the intermediate part 14B corresponding to the first A direction, a first B wall 50BB (second wall portion) that forms the outer peripheral surface of the intermediate part 14B corresponding to the first B direction, and a pair of side walls 50BC (see FIG. 3) that forms the outer peripheral surfaces of the intermediate part 14B perpendicular to both the first direction and the second direction.

The first A wall 50BA faces the solenoid 54 provided on the outer peripheral surface of the second lens barrel unit 42 (corresponding to "a first outer peripheral surface of the second holding unit"). That is, the solenoid 54 is disposed between the first A wall 50BA and the second holding unit 15B. On the other hand, the solenoid 54 or other electric drive units are not disposed between each of the first B wall 50BB and the pair of side walls 50BC and the second holding unit 15B. For this reason, a distance between the outer peripheral surface of the second holding unit 15B and the first A wall 50BA is longer than a distance between the outer peripheral surface of the second holding unit 15B and the first B wall 50BB, and is longer than a distance between the outer peripheral surface of the second holding unit 15B and each of the pair of side walls 50BC. Since the solenoid 54 is not moved rotationally by the second rotational movement unit R2, the solenoid 54 is not turned around to the first B wall 50BB. For this reason, a space between the second holding unit 15B and the first B wall 50BB can be made compact.

Further, the second exterior cover 50B includes a second A wall 50BD that forms the outer peripheral surface of the intermediate part 14B corresponding to the second A direction. The thickness direction of the second A wall 50BD is directed to the second direction.

The first exterior cover 50A corresponds to the third cover part and covers a part of the zoom motor 51. Furthermore, the first exterior cover 50A also covers the first lens barrel unit 41. The first exterior cover 50A forms the incident-side end part 14A and is not moved with respect to rotation caused by the first rotational movement unit R1. The first exterior cover 50A is formed in a substantially cylindrical shape having an axis on the first optical axis A1.

Examples of respective electric drive units 51 to 54 include motors and solenoids in the example, but include other mechanisms as long as being components that are driven by electricity. For example, there is even a case where the projection device 10 includes an electronic pen that is capable of drawing characters and the like on a projection surface as disclosed in JP2017-142726A. In this case, the electric drive unit may be a drive unit for an imaging element that images light generated with the drawing of the electronic pen.

A transmission type image forming panel, which uses an LCD instead of a DMD, may be used as the image forming panel 32 corresponding to an electro-optical element. Alternatively, a panel using a self-luminous element, such as a light emitting diode (LED) and/or an organic electroluminescence (EL) display, instead of a DMD may be used. A total reflection type mirror may be used as the reflective part instead of a specular reflection mirror.

An example where a laser light source is used as the light source 34 has been described in the example, but the invention is not limited thereto. A mercury lamp and/or an LED may be used as the light source 34. Further, the blue laser light source and the yellow phosphor have been used in the example, but the invention is not limited thereto. A green phosphor and a red phosphor may be used instead of the yellow phosphor. Furthermore, a green laser light source and a red laser light source may be used instead of the yellow phosphor.

Further, an example where the projection lens 11 includes the bending optical system for bending an optical axis twice has been described in the example, but the invention is not limited thereto. A bending optical system for bending an optical axis once may be used. That is, the bending optical system of the projection lens may be a bending optical system having two optical axes, that is, the second optical axis and the third optical axis. In this case, the first holding unit 15A, the first exterior cover 50A, and the first rotational movement unit R1 are not necessary, and the second holding unit 15B is non-rotatably connected to the body part 12 serving as a housing.

Furthermore, in the example, the second rotational movement unit R2 is a support member in a case where the second outer peripheral surface of the third holding unit 15C (the outer peripheral surface of the inner barrel 42B of the second lens barrel unit 42) is moved rotationally with respect to the first inner peripheral surface of the second holding unit 15B (the inner peripheral surface of the outer barrel 42A of the second lens barrel unit 42). However, instead of this, the second rotational movement unit R2 may be a support member that allows the second inner peripheral surface of the third holding unit 15C to be moved rotationally with respect to the first outer peripheral surface of the second holding unit 15B.

Further, an example where the solenoid 54 as the second electric drive unit forms the intermediate part 14B (an example where the solenoid 54 is fixed to the second holding unit 15B) has been described in the example, but the solenoid 54 may form the emission-side end part 14C instead of this. For example, the second rotational movement unit R2 may be adapted to allow the second inner peripheral surface of the third holding unit 15C to be moved rotationally with respect to the first outer peripheral surface of the second holding unit, and the solenoid 54 may be fixed to the second outer peripheral surface of the third holding unit 15C.

In this specification, "A and/or B" is synonymous with "at least one of A or B". That is, "A and/or B" may mean only A, may mean only B, or may mean a combination of A and B. Further, in this specification, the same meaning as "A and/or B" is applied even in a case where three or more items are expressed so as to be connected using "and/or".

All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

Further, projection lenses according to Additional claims to be described below can be grasped from the above description.

[Additional claim 1]

A projection lens that is mounted on a housing of a projection device including an electro-optical element, the projection lens comprising:

an optical system through which light passes;

a second holding unit through which light parallel to a second optical axis passes and which is moved rotationally with respect to the housing;

a third holding unit through which light parallel to a third optical axis obtained from bending of the second optical axis passes and which is moved rotationally with respect to the second holding unit;

an electric drive unit that electrically controls rotational movement of the second holding unit with respect to the housing, rotational movement of the third holding unit with respect to the second holding unit, or drive of the optical system; and a cover part that covers the electric drive unit, wherein the electric drive unit includes a second electric drive unit, the projection lens comprises a first reflective part that is provided in the second holding unit and refracts light parallel to a first optical axis to form the light parallel to the second optical axis, the first optical axis is an optical axis extending in a first direction, the first direction includes a first A direction and a first B direction opposite to the first A direction, the light parallel to the first optical axis travels in the first B direction, the second electric drive unit is provided on a first outer peripheral surface of the second holding unit, the second electric drive unit is closer to one side corresponding to the first A direction than the first reflective part, the cover part includes a first wall portion facing the second electric drive unit and a second wall portion not facing the second electric drive unit, and a distance between the first outer peripheral surface and the first wall portion is longer than a distance between the first outer peripheral surface and the second wall portion.

[Additional claim 2]

The projection lens according to additional claim 1, further comprising:

an emission optical system that is provided in the third holding unit, wherein the electric drive unit includes a first electric drive unit that is provided on the third holding unit, and the cover part includes a first cover part that covers the first electric drive unit.

[Additional claim 3]

The projection lens according to additional claim 1 or 2, wherein a part of the third holding unit is moved rotationally in the second holding unit, the second electric drive unit controls rotational movement of the third holding unit with respect to the second holding unit, and the second electric drive unit is provided on a portion of the first outer peripheral surface of the second holding unit overlapping with the third holding unit.

[Additional claim 4]

The projection lens according to any one of additional claims 1 to 3, wherein the second electric drive unit controls rotational movement of the third holding unit with respect to the second holding unit.

[Additional claim 5]

The projection lens according to any one of additional claims 1 to 4, further comprising:

a first holding unit through which the light parallel to the first optical axis incident from the housing passes and which is connected to the housing; and a fourth electric drive unit that controls the drive of the optical system, wherein the second holding unit is moved rotationally with respect to the first holding unit, the light parallel to the second optical axis is light obtained from bending of the light parallel to the first optical axis, and the fourth electric drive unit is provided on the first holding unit.

[Additional claim 6]

A projection device comprising:
the projection lens according to any one of additional claims 1 to 5.

[Additional claim 7]

A projection device comprising:
the projection lens according to any one of additional claims 1 to 5; and
the housing,
wherein the housing has an aspect where one of four corners of a rectangular parallelepiped is removed, and has an L-shape in a plan view, and a portion of the housing where the corner is removed functions as a storage portion in which the projection lens is to be stored, and in a storage state where the projection lens is stored in the storage portion, a surface of the housing is flush with a surface of the cover part and the projection device has a rectangular parallelepiped shape as a whole in which the projection lens and the housing are combined with each other.

What is claimed is:

1. A projection lens that is mounted on a housing of a projection device including an electro-optical element, the projection lens comprising:
    an optical system through which light passes;
    a second holding unit through which light parallel to a second optical axis passes and which is moved rotationally with respect to the housing;
    a third holding unit through which light parallel to a third optical axis obtained from bending of the second optical axis passes and which is moved rotationally with respect to the second holding unit;
    an electric drive unit that electrically controls rotational movement of the second holding unit with respect to the housing, rotational movement of the third holding unit with respect to the second holding unit, or drive of the optical system; and
    a cover part that covers the electric drive unit.

2. The projection lens according to claim 1, further comprising:
    an emission optical system that is provided in the third holding unit,
    wherein the electric drive unit includes a first electric drive unit that is provided on the third holding unit, and
    the cover part includes a first cover part that covers the first electric drive unit.

3. The projection lens according to claim 1,
    wherein the electric drive unit includes a second electric drive unit,
    the projection lens comprises a first reflective part that is provided in the second holding unit and refracts light parallel to a first optical axis to form the light parallel to the second optical axis,
    the first optical axis is an optical axis extending in a first direction,
    the first direction includes a first A direction and a first B direction opposite to the first A direction,
    the light parallel to the first optical axis travels in the first B direction,
    the second electric drive unit is provided on a surface of the second holding unit or the third holding unit, and the second electric drive unit is closer to one side corresponding to the first A direction than the first reflective part.

4. The projection lens according to claim 2,
    wherein the electric drive unit includes a second electric drive unit,
    the projection lens comprises a first reflective part that is provided in the second holding unit and refracts light parallel to a first optical axis to form the light parallel to the second optical axis,
    the first optical axis is an optical axis extending in a first direction,
    the first direction includes a first A direction and a first B direction opposite to the first A direction,
    the light parallel to the first optical axis travels in the first B direction,
    the second electric drive unit is provided on a surface of the second holding unit or the third holding unit, and
    the second electric drive unit is closer to one side corresponding to the first A direction than the first reflective part.

5. The projection lens according to claim 3,
    wherein the second electric drive unit controls the rotational movement of the third holding unit with respect to the second holding unit, and
    the second electric drive unit is provided on a portion of a first outer peripheral surface of the second holding unit overlapping with the third holding unit.

6. The projection lens according to claim 1,
    wherein the electric drive unit includes a second electric drive unit,
    the second electric drive unit controls the rotational movement of the third holding unit with respect to the second holding unit,
    the second electric drive unit is provided on a first outer peripheral surface of the second holding unit,
    the cover part includes a second cover part that covers the second electric drive unit,
    the second cover part includes a first wall portion facing the second electric drive unit and a second wall portion not facing the second electric drive unit, and
    a distance between the first outer peripheral surface and the first wall portion is longer than a distance between the first outer peripheral surface and the second wall portion.

7. The projection lens according to claim 2,
    wherein the electric drive unit includes a second electric drive unit,
    the second electric drive unit controls the rotational movement of the third holding unit with respect to the second holding unit,
    the second electric drive unit is provided on a first outer peripheral surface of the second holding unit,
    the cover part includes a second cover part that covers the second electric drive unit,
    the second cover part includes a first wall portion facing the second electric drive unit and a second wall portion not facing the second electric drive unit, and
    a distance between the first outer peripheral surface and the first wall portion is longer than a distance between the first outer peripheral surface and the second wall portion.

8. The projection lens according to claim 1 further comprising:
    a first holding unit through which light parallel to a first optical axis incident from the housing passes and which is connected to the housing; and a fourth electric drive unit that controls the drive of the optical system,
wherein the second holding unit is moved rotationally with respect to the first holding unit,
the light parallel to the second optical axis is light obtained from bending of the light parallel to the first optical axis, and
the fourth electric drive unit is provided on the first holding unit.

9. The projection lens according to claim 2, further comprising:
a first holding unit through which light parallel to a first optical axis incident from the housing passes and which is connected to the housing; and
a fourth electric drive unit that controls the drive of the optical system,
wherein the second holding unit is moved rotationally with respect to the first holding unit,
the light parallel to the second optical axis is light obtained from bending of the light parallel to the first optical axis, and
the fourth electric drive unit is provided on the first holding unit.

10. The projection lens according to claim 3, further comprising:
a first holding unit through which light parallel to a first optical axis incident from the housing passes and which is connected to the housing; and
a fourth electric drive unit that controls the drive of the optical system,
wherein the second holding unit is moved rotationally with respect to the first holding unit,
the light parallel to the second optical axis is light obtained from bending of the light parallel to the first optical axis, and
the fourth electric drive unit is provided on the first holding unit.

11. The projection lens according to claim 4, further comprising:
a first holding unit through which light parallel to a first optical axis incident from the housing passes and which is connected to the housing; and
a fourth electric drive unit that controls the drive of the optical system,
wherein the second holding unit is moved rotationally with respect to the first holding unit,
the light parallel to the second optical axis is light obtained from bending of the light parallel to the first optical axis, and
the fourth electric drive unit is provided on the first holding unit.

12. The projection lens according to claim 5, further comprising:
a first holding unit through which light parallel to a first optical axis incident from the housing passes and which is connected to the housing; and
a fourth electric drive unit that controls the drive of the optical system,
wherein the second holding unit is moved rotationally with respect to the first holding unit,
the light parallel to the second optical axis is light obtained from bending of the light parallel to the first optical axis, and
the fourth electric drive unit is provided on the first holding unit.

13. A projection device comprising:
the projection lens according to claim 1.

14. A projection device comprising:
the projection lens according to claim 2.

15. A projection device comprising:
the projection lens according to claim 3.

16. A projection device comprising:
the projection lens according to claim 4.

17. A projection device comprising:
the projection lens according to claim 5.

18. A projection device comprising:
the projection lens according to claim 6.

19. A projection device comprising:
the projection lens according to claim 2; and
the housing,
wherein a side surface of the housing is flush with a side surface of the first cover part.

20. The projection device according to claim 19, further comprising:
a base portion as the housing;
a protruding portion that protrudes from the base portion; and
a storage portion that is adjacent to the protruding portion,
wherein the projection lens is positioned in the storage portion.

* * * * *